A. H. LEATHERMAN.
CORN PLANTER.
APPLICATION FILED MAR. 7, 1910.
977,021.
Patented Nov. 29, 1910.
2 SHEETS—SHEET 1.
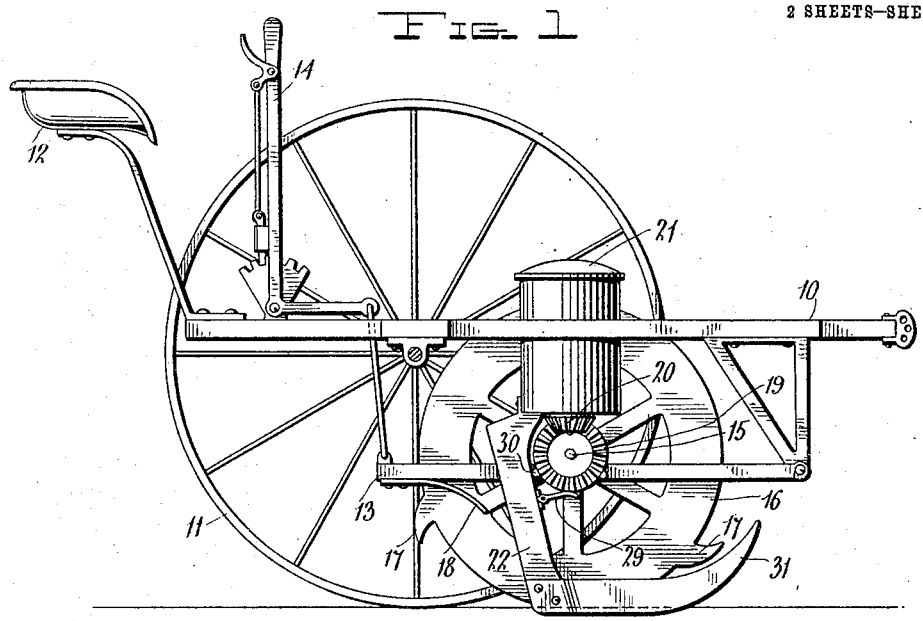
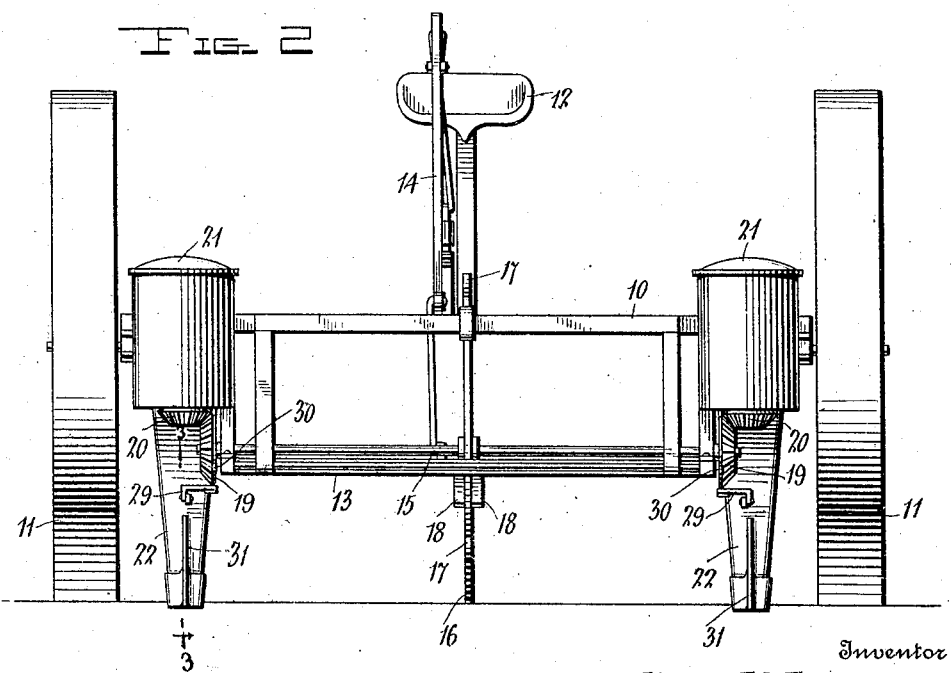
Witnesses
Inventor
Alpha H. Leatherman
By
Attorneys

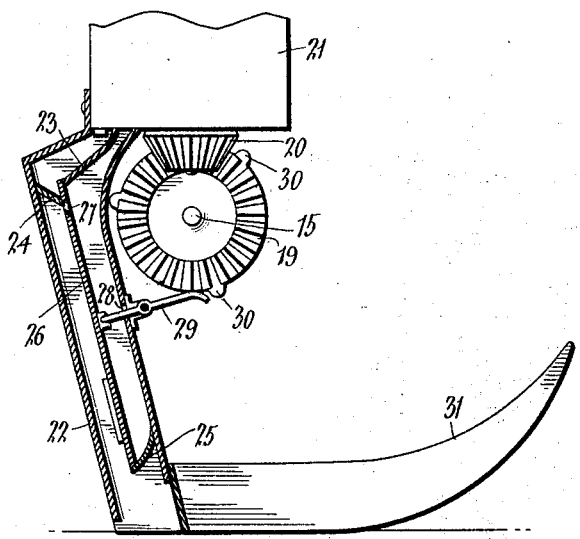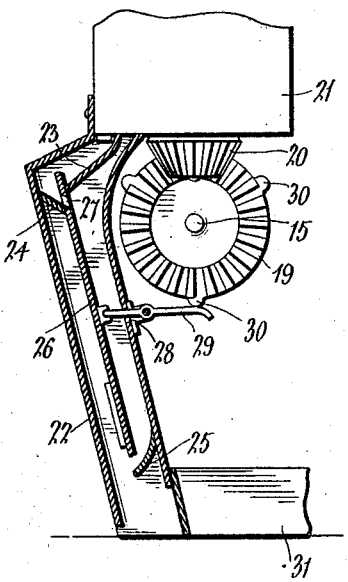

UNITED STATES PATENT OFFICE.

ALPHA H. LEATHERMAN, OF MOUNDRIDGE, KANSAS.

CORN-PLANTER.

977,021.  Specification of Letters Patent.  Patented Nov. 29, 1910.

Application filed March 7, 1910. Serial No. 547,752.

*To all whom it may concern:*

Be it known that I, ALPHA H. LEATHERMAN, a citizen of the United States, residing at Moundridge, in the county of McPherson, State of Kansas, have invented certain new and useful Improvements in Corn-Planters; and I do hereby declare the following to be a full, clear, and exact description of the invention, such as will enable others skilled in the art to which it appertains to make and use the same.

This invention relates to corn planters and has special reference to a check row corn planter operable without the use of wire.

One object of the invention is to improve the construction of the seed tubes common in corn planters so that the seed may be deposited at the precise spot required.

Another object of the invention is to improve the general structure of corn planters so that the wheel used to operate the seed mechanism may be at all times immediately in front of and below the operator, thus enabling him to follow the mark made by the marker, with accuracy.

With the above and other objects in view, the invention consists in general of a corn planter having improved means for controlling the dropping of the seed, together with an improved guiding wheel arranged to actuate said means.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of a planter constructed in accordance with this invention. Fig. 2 is a rear elevation of such a planter. Fig. 3 is a detail view of a portion of the mechanism used for controlling the dropping of the seed, the view being partly in elevation and partly in section on the line 3—3 of Fig. 2 and showing the seed tube closed. Fig. 4 is a view similar to Fig. 3 showing the seed tube open.

The numeral 10 indicates the frame of the implement and this is supported on the usual ground wheels 11. Upon the frame 10 is a driver's seat 12 preferably located in the longitudinal center line of the frame. At 13 is a supplementary frame which is hinged at the forward end to the main frame 10 and is provided with any suitable means as indicated at 14 to lift the rear end. Carried in suitable bearings in the rear end of this frame is a shaft 15 centrally disposed of which is a ground wheel 16 having projecting lugs 17. This ground wheel has positioned adjacent thereto a scraper 18, there being one of these scrapers on each side of the wheel so that any dirt adhering thereto is removed by said scrapers. The ground wheel just described is positioned immediately in front of and below the driver's seat so that by keeping his eye on the edge of this wheel he is enabled to accurately follow the trace left by the marker common with such implements. It is, of course, obvious that raising or lowering the rear end of the supplemental frame 13 throws this wheel into or out of contact with the ground and thus acts to render the mechanism controlled by the wheel operative or inoperative as the case may be. On each end of the shaft 15 are bevel gears 19 each of which meshes with a gear 20 controlling the ordinary feeding mechanism common to implements of this description and which is contained in the seed boxes 21. This mechanism is not here shown as it is of any ordinary and well known type. Extending downward from each of the seed boxes 21 is a seed tube 22 the upper end of which is provided with a downwardly slanting partition 23 whereon the seed delivered from the respective box 21 drops. This partition preferably extends from the front portion of the seed tube and slants downward toward the middle thereof. Below the partition 23 and extending from the rear of the tube is a second slanting partition 24 while at the lower end of the tube, and extending from the front thereof, is a third slanting partition 25. Slidable longitudinally in each tube is a slide 26 which has an opening 27 adjacent the upper end thereof. This slide is so arranged that the partitions 24 and 25 have their free edges bearing respectively against the rear and front sides of said slide. Extending through an opening 28 in the front wall of each tube is a lever 29 the inner arm of which is connected to the slide 26, the lever being fulcrumed intermediate its ends. The outer arm of this lever extends forward and terminates beneath the respective gear 19, the latter being provided with a series of projections 30 arranged to successively strike the lever 29. On the lower end of each tube is the usual furrow opener 31.

In the operation of this device marks are made along each side of the field and the planter brought up in such position that one of the lugs 17 contacts with one of these marks. The planter is then driven across the field, the supplemental frame being dropped to operative position. As the planter moves along the mechanism in the seed boxes acts to deliver seed into the chamber at the upper end of the seed tube, which chamber is formed by the partitions and slide. Whenever one of the lugs 30 strikes the outer end of the lever 29 the slide 26 is raised and this brings the opening 27 above the partition 24 so that the seed retained behind the slide is permitted to drop through said opening. By reason of the fact that the raising of the slide 26 is but momentary the latter falls and catches the seed between itself and the lower partition thus retaining it in what may be called the lower chamber. Now, when the next succeeding projection 30 strikes the lever 29 the seed in the upper chamber are released and at the same time the seed in the lower chamber are also released, the latter dropping into the furrow on the ground while the former are again caught and retained by the slide until its next actuation by one of the projections 30. Meanwhile the driver has been enabled, by watching the trace of the marker, to follow the same very accurately, any slight deviation having but little effect owing to the fact that the ground wheel which actuates the dropper mechanism is centrally disposed of the implement.

When the end of the row has been reached the implement is turned around and the operation repeated, it only being necessary to be careful in starting that one of the lugs 17 be positioned correctly.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a corn planter, a seed tube, a slide extending longitudinally of said tube and having an opening adjacent its upper end, a partition fixed in said tube and extending partly across the same with its free edge bearing against one side of said slide, a second partition fixed in said tube and extending partly across the same with its free edge bearing against the opposite side of said slide, and means to move said slide and momentarily open both the chambers in the tube formed by the slide and partitions.

2. In a corn planter, a seed tube, a slide extending longitudinally of said tube and having an opening adjacent its upper end, a partition extending from the rear of said tube inward and downward and having its front edge bearing against the rear of said slide and normally just above the opening therein, a second partition extending from the front of said tube inward and downward and having its rear edge bearing against the bottom of the front of said slide, and means to raise said slide and momentarily open both the chambers in the tube formed by the slide and partitions.

3. In a corn planter, a seed tube, a slide extending longitudinally of said tube and having an opening adjacent its upper end, a partition fixed in said tube and extending partly across the same with its free edge bearing against one side of said slide, a second partition fixed in said tube and extending partly across the same with its free edge bearing against the opposite side of said slide, and means to move said slide and momentarily open both the chambers in the tube formed by the slide and partitions, said means including a lever pivoted intermediate its ends to the tube and having its inner end connected to the slide and its outer end extending beyond the tube, a wheel having a series of projections thereon in the paths of which the outer end of the lever lies, a shaft supporting said wheel, and rotating mechanism for the shaft.

4. In a corn planter, a seed tube, a slide extending longitudinally of said tube and having an opening adjacent its upper end, a partition extending from the rear of said tube inward and downward and having its front edge bearing against the rear of said slide and normally just above the opening therein, a second partition extending from the front of said tube inward and downward and having its rear edge bearing against the bottom of the front of said slide, and means to raise said slide and momentarily open both the chambers in the tube formed by the slide and partitions, said means including a lever pivoted intermediate its ends to the tube and having its inner end connected to the slide and its outer end extending beyond the tube, a wheel having a series of projections thereon in the paths of which the outer end of the lever lies, a shaft supporting said wheel, and rotating mechanism for the shaft.

5. In a corn planter, a seed tube, a slide extending longitudinally of said tube and having an opening adjacent its upper end, a partition fixed in said tube and extending partly across the same with its free edge bearing against one side of said slide, a second partition fixed in said tube and extending partly across the same with is free edge bearing against the opposite side of said slide, and means to move said slide and momentarily open both the chambers in the tube formed by the slide and partitions, said means including a lever pivoted intermediate its ends to the tube and having its inner end connected to the slide and its outer end extending beyond the tube, a wheel having a series of projections thereon in the paths of which the outer end of the lever lies, a shaft supporting said wheel, and a guide wheel fixed to the shaft and engaging the ground as the implement is moved.

6. In a corn planter, a seed tube, a slide extending longitudinally of said tube and having an opening adjacent its upper end, a partition extending from the rear of said tube inward and downward and having its front edge bearing against the rear of said slide and normally just above the opening therein, a second partition extending from the front of said tube inward and downward and having its rear edge bearing against the bottom of the front of said slide, and means to raise said slide and momentarily open both the chambers in the tube formed by the slide and partitions, said means including a lever pivoted intermediate its ends to the tube and having its inner end connected to the slide and its outer end extending beyond the tube, a wheel havig a series of projections thereon in the paths of which the outer end of the lever lies, a shaft supporting said wheel, and a guide wheel fixed to the shaft and engaging the ground as the implement is moved.

In testimony whereof, I affix my signature, in presence of two witnesses.

ALPHA H. LEATHERMAN.

Witnesses:
 HENRY MILLER,
 E. P. GOERING.